United States Patent
Itai

(10) Patent No.: US 7,333,229 B2
(45) Date of Patent: Feb. 19, 2008

(54) PRINT CONTROL UNIT

(75) Inventor: Tomohiro Itai, Fukushima (JP)

(73) Assignee: Oki Data Corporation, Tokyo (JP)

( * ) Notice: Subject to any disclaimer, the term of this patent is extended or adjusted under 35 U.S.C. 154(b) by 962 days.

(21) Appl. No.: 10/453,516

(22) Filed: Jun. 4, 2003

(65) Prior Publication Data

US 2003/0227650 A1 Dec. 11, 2003

(30) Foreign Application Priority Data

Jun. 6, 2002 (JP) ............................. 2002-165024

(51) Int. Cl.
*G06F 3/12* (2006.01)
*G06F 15/00* (2006.01)
*G06K 1/00* (2006.01)

(52) U.S. Cl. ................... 358/1.15; 358/1.13; 358/1.18; 358/1.1; 358/1.14

(58) Field of Classification Search ............... 358/1.13, 358/1.15, 1.18

See application file for complete search history.

(56) References Cited

U.S. PATENT DOCUMENTS

| | | | |
|---|---|---|---|
| 5,604,844 A * | 2/1997 | Nishiyama | 358/1.12 |
| 6,567,180 B1 * | 5/2003 | Kageyama et al. | 358/1.15 |
| 6,600,569 B1 * | 7/2003 | Osada et al. | 358/1.12 |
| 7,099,036 B2 * | 8/2006 | Maeda et al. | 358/1.16 |

* cited by examiner

*Primary Examiner*—Twyler Lamb
*Assistant Examiner*—Hilina S Kassa
(74) *Attorney, Agent, or Firm*—Takeuchi & Kubotera, LLP

(57) ABSTRACT

In order to provide a print control unit capable of selecting predefined information corresponding to a document to be printed without depending upon an artificial operation, the print control unit comprises an information storing section which links identification information for identifying a kind of document and predefined information for controlling a printing job of the document and stores an information package of the linked identification and predefined information, an identification information retrieving section which retrieves the identification information of the document to be printed, and a predefined information selecting section which selects the predefined information linked with the identification information retrieved by the identification information retrieving section, from the information package stored in the information storing section.

20 Claims, 15 Drawing Sheets

| Name | Data |
|---|---|
| Profile 1 | 01 05 30 02 81··· |
| Profile 2 | 00 00 b2 21 c3··· |
| Profile 3 | 06 07 08 09··· |
| Profile 4 | c0 22 3A d3 00··· |

| Name | Data |
|---|---|
| abc.doc | Profile 1 |
| aaa.txt | Profile 2 |
| bbb.xls | Profile 3 |
| ccc.jpg | Profile 4 |

| Name | Data |
|------|------|
| abc.doc | Profile 1 |
| aaa.txt | Profile 2 |
| bbb.xls | Profile 3 |
| ccc.jpg | Profile 4 |

Search of document identification information abc.doc

FIG. 8

| Name | Data |
|---|---|
| abc.doc:990124082356 | Profile 1 |
| aaa.txt:981203095637 | Profile 2 |
| bbb.xls | Profile 3 |
| ccc.jpg | Profile 4 |

↑ Addition of creation time

| Name | Data |
|---|---|
| abc.doc:990124082356 | Profile 1 |
| aaa.txt:981203095637 | Profile 2 |
| bbb.xls:981204095736 | Profile 6 |
| ccc.jpg | Profile 4 |

FIG. 14

PRINT CONTROL UNIT

BACKGROUND OF THE INVENTION

1. Field of the Invention

The present invention relates to a print control unit for controlling print according to information which is predefined corresponding to each document.

2. Description of the Related Art

A printer prints a document, such as document data and image data, with control by a print control unit or a driver. The print control unit controls print in accordance with properties which are artificially set, such as paper size, number of copies, printing orientation, magnification, reduction, divisional print, media type, brightness, contrast, and saturation. These properties are stored in the print control unit as predefined information of binary data called a profile. When the printer prints a document previously printed, the predefined information is used by the print control unit for the document.

In a conventional print control unit, when the printer prints the same document, the predefined information corresponding to the document is artificially selected from a plurality of predefined information stored in the print control unit. Then, print data is sent to the printer with the selected predefined information. The user is required to memorize the properties of a document which has been printed or select a predefined piece of information corresponding to the document from a plurality of predefined information. Accordingly, the burden of selecting the predefined information is imposed on the user. If the user selects incorrect information which does not correspond to the document to be printed, the desired print is not obtained. Moreover, a sheet of paper is wasted.

SUMMARY OF THE INVENTION

Accordingly, it is one of objects of the present invention to provide a print control unit capable of setting appropriate predefined information corresponding to the document to be printed without depending upon artificial operation.

In order to achieve the above object, according to the invention, a print control unit comprises an information storing section which links identification information for identifying a kind of document and predefined information for controlling a printing job of the document and stores an information package of the linked identification and predefined information, an identification information retrieving section which retrieves the identification information of the document to be printed, and a predefined information selecting section which selects the predefined information linked with the identification information retrieved by the identification information retrieving section, from the information package stored in the information storing section.

BRIEF DESCRIPTION OF THE DRAWINGS

FIG. 8 a table showing the document identification information contained in the linkage information in the first embodiment.

FIG. 14 is tables showing existing linkage information and new linkage information which is made by continuing the correlation even after receiving the warning on the correlation in the second embodiment.

DESCRIPTION OF THE PREFERRED EMBODIMENT

First Embodiment

Figure 1:
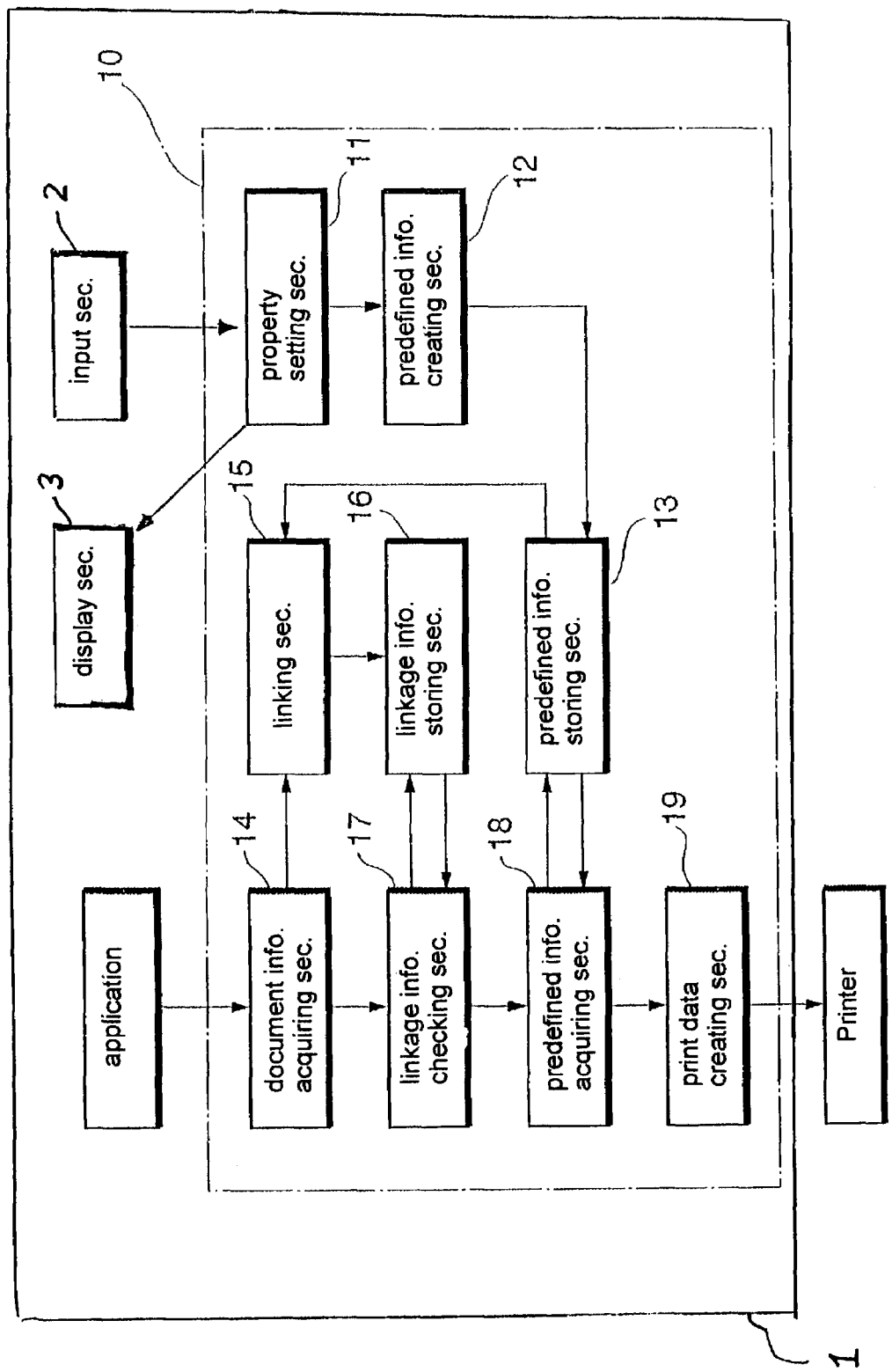
FIG. 1 is a block diagram of a print control unit according to the present invention.

In FIG. 1, a print control unit 10 is provided in an information processing apparatus 1, such as a personal computer, which is connected to a printing machine, for example, a printer for printing a document, such as document data or image data. An operating system (not shown) is installed in the information processing apparatus 1. The information processing apparatus 1 operates on the operating system and is provided with an application program to print the document. The information processing apparatus 1 comprises an input section 2, such as a keyboard, a switch, or a mouse, to receive information from the user and a display section 3, such as a CRT monitor or an LCD display to display information based upon the information inputted through the input section 2.

The print control unit 10 comprises a property setting section 11 for setting properties, such as paper size, number of copies, printing orientation, magnification, reduction, divisional print, media type, brightness, contrast, and saturation, a predefined information creating section 12 to create predefined information called a profile based upon the properties which are set by the property setting section 11 according to the information inputted through the input section 2, and a predefined information storing section 13 to store the predefined information and index information for indexing the predefined information.

The print control unit 10 also comprises a document information acquiring section 14 to acquire from the application program, document identification information indicated as a file name of the document to be printed, a linking section 15 to create linkage information which links or correlates the document identification information in the document information acquiring section 14 and the index information in the predefined information storing section 13, and a linkage information storing section 16 to store the linkage information from the linking section 15.

The print control unit 10 further comprises a linkage information checking section 17 to check whether there is any linkage information corresponding to the document identification information and select the index information corresponding to the document identification information, a predefined information acquiring section 18 to select the predefined information stored in the predefined information storing section 13 according to the index information, and a print information creating section 19 to create print data for controlling the printer according to the predefined information selected by the predefined information acquiring section 18 and document data.

Figure 2:
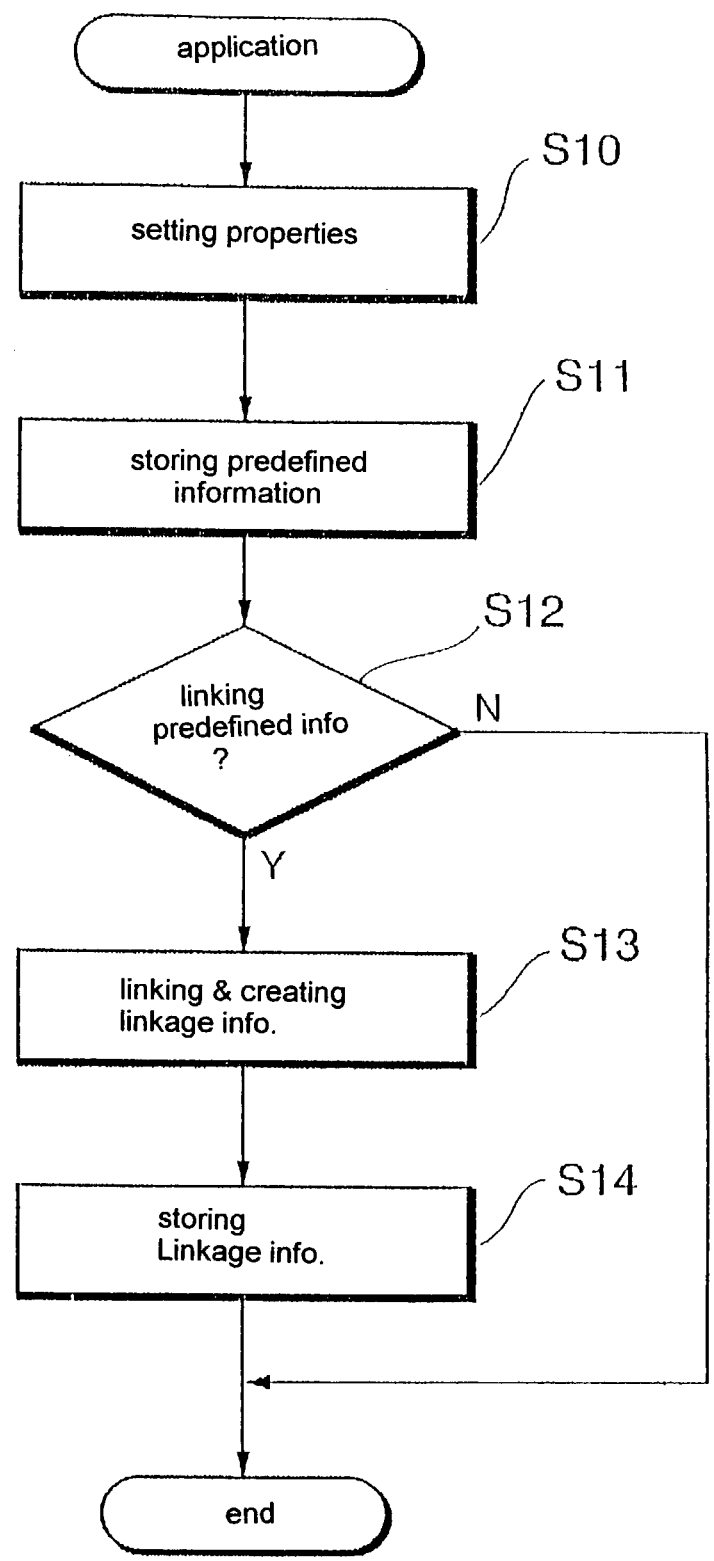
FIG. 2 is a flow chart showing operations which correlate or link document identification information with index information according to the first embodiment of the present invention.
Figure 16:
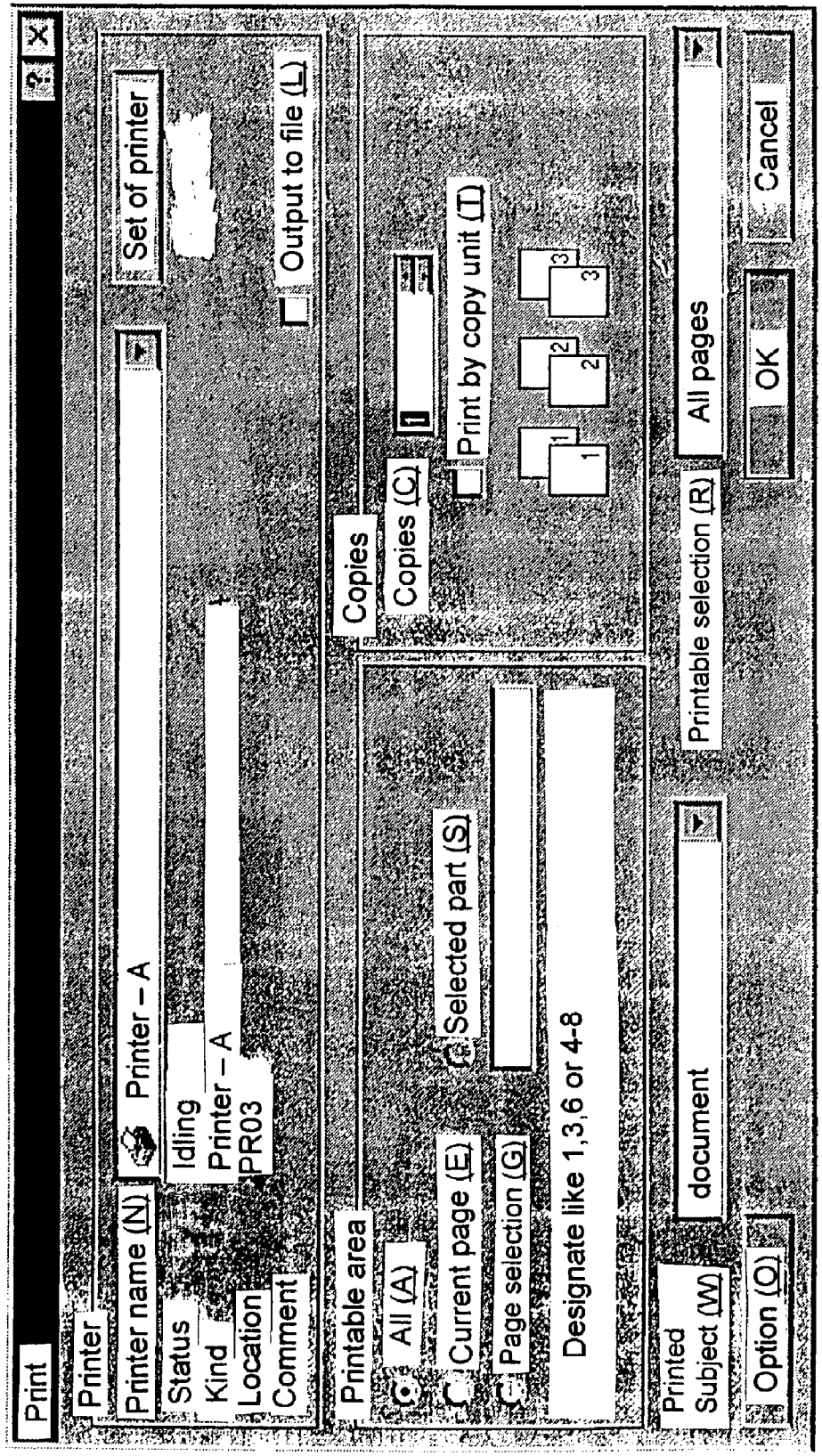
FIG. 16 is a diagram of a monitor display when the user inputs a printer setting according to the first or second embodiments.
Figure 17:
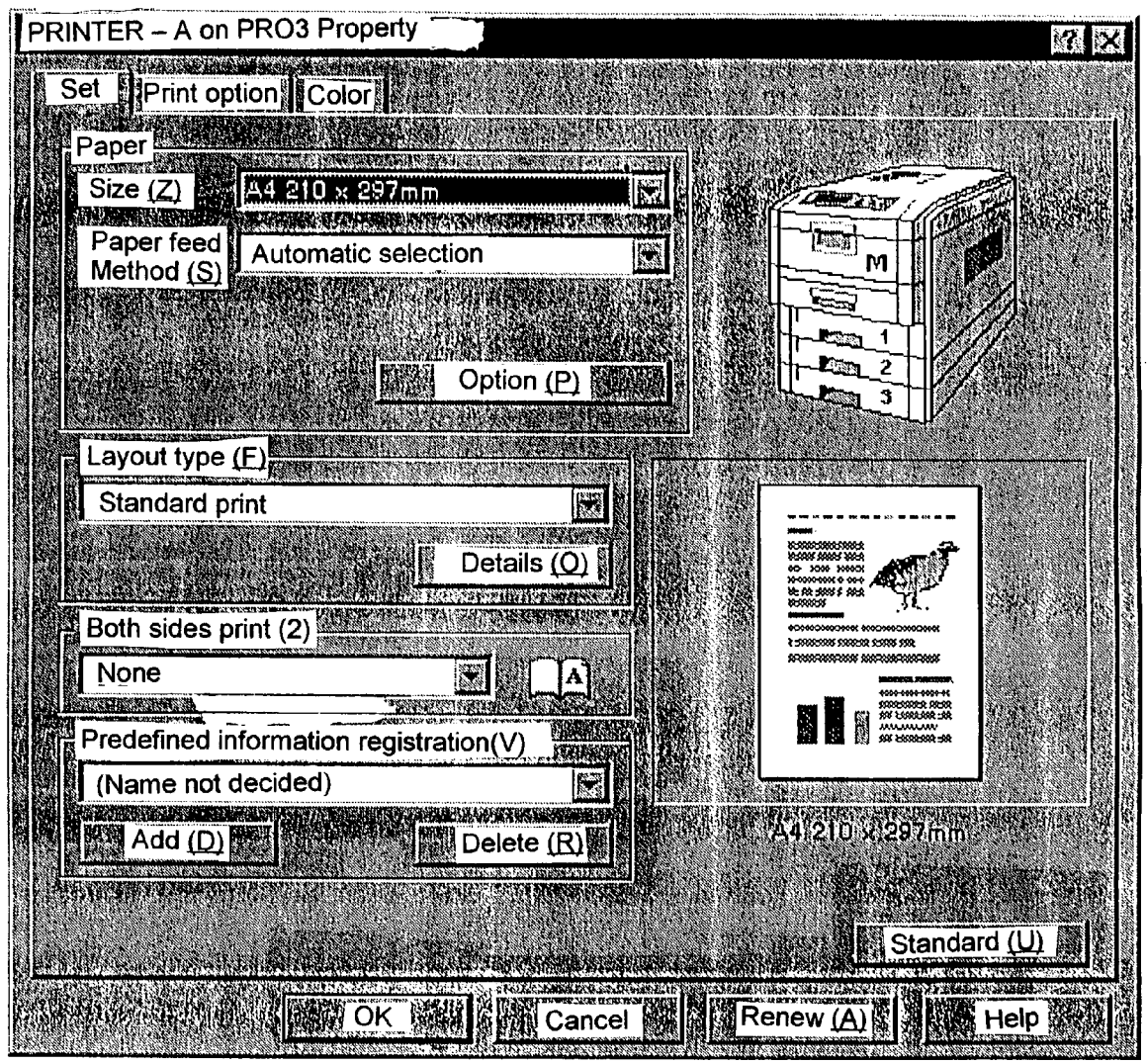
FIG. 17 is a diagram of a monitor display when the user inputs a predefined information registration according to the first or second embodiments.

In FIG. 2, properties to control the printer, such as paper size, number of copies, printing orientation, magnification, reduction, divisional print, media type, brightness, contrast, and saturation, are inputted by the user through the input section 2 and stored in the property setting section 11. For example, printer setting (FIG. 16) in the printer driver 10 of the information processing apparatus 1 is selected. Various properties in the printer setting are displayed in the display section 3 (FIG. 17) and each item of the properties is selected through the input section 2. Then, a predefined information registration switch is pressed to register the selected properties (Step S10).

Figures 3, 4:
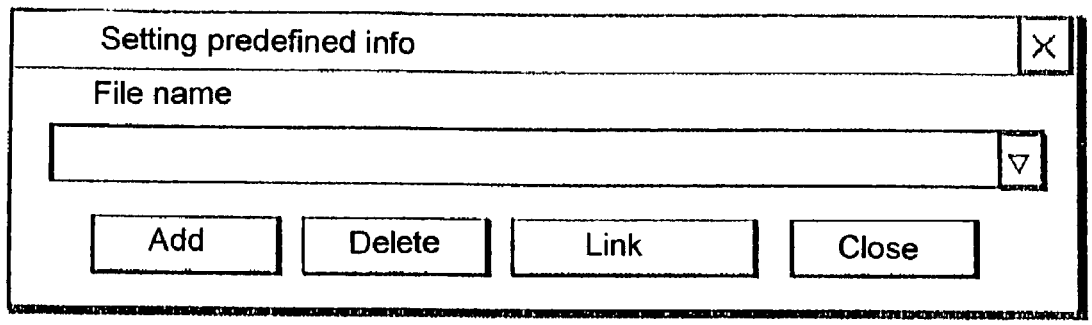
FIG. 3 is a diagram of a monitor display when the user inputs the index information according to the first or second embodiment of the present invention.
FIG. 4 is a table showing a relationship between the predefined information and the corresponding index information according to the first or second embodiment.

When the predefined information creating section 12 receives the selected properties, it creates predefined information called a profile. FIG. 3 shows a display in the display section 3 at this moment. Index information to index the predefined information (for example, a file name to represent the predefined information) is inputted through input section 2. In FIG. 4, four pairs of the predefined information and the corresponding index information are shown. For example, the predefined information is indicated as a structure composed of binary data, such as 01, 05, 30, 02, and 81, and the index information corresponding to the predefined information is indicated as "Profile 1". The index information is usually appended on the predefined information corresponding to document. When the specified document is selected and printed, the index information is used as a header to select the predefined information corresponding to the document from a plurality of predefined information. For example, when the index information (file name) is "2up both side", indicating that a data amount equal to two pages is compressed-printed in one page and printed on both sides of a sheet, the predefined information (binary data) is composed of a command to designate "2up both sides".

The predefined information and index information are stored in the predefined information storing section 13 located in a part of the area called registry (Step S11).

The user decides whether or not the document is linked with the index information (Step S12).

When the document is not linked with the predefined information, the user clicks "close" in the display in FIG. 3. Consequently, the linking section 15 does not create the linkage information and the process is ended.

When the document is linked with the predefined information, the user clicks "link" in the display in FIG. 3. Consequently, the index information is sent to the linking section 15 and the display of FIG. 5 is shown in the display section 3.

Figures 5, 6:
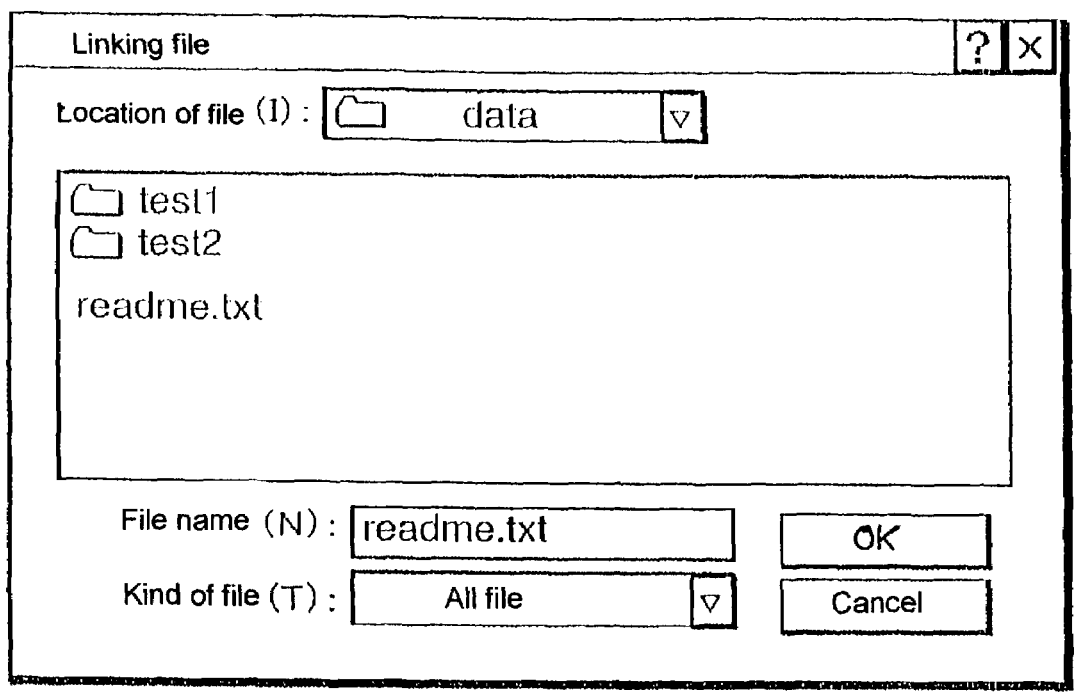
FIG. 5 is a diagram of a monitor display showing the linkage (correlation) in the first embodiment.
FIG. 6 is a table showing linkage (correlation) information between the document identification information and the index information in the first embodiment.

In FIG. 5, the file name of the document to be linked is inputted through input section 2 so that the document information acquiring section 14 acquires the file name as document identification information and sends the file name to the linking section 15. For example, a file name which is currently being edited in the application is indicated in the file name column by default. The file name may be changed to another file name later.

Then, the user clicks "OK" in FIG. 5 so that the linking section 15 creates the linkage information which links the file name sent from the document information acquiring section 14 and the index information sent from the predefined information storing section 13 (Step S13).

In FIG. 6, four pairs of linkage information are displayed. For example, the file name of the document is "abc.doc" and the index information linked with the file name is "Profile 1". The linkage information is stored in the linkage information storing section 16 in the registry (Step S14).

Figure 7:
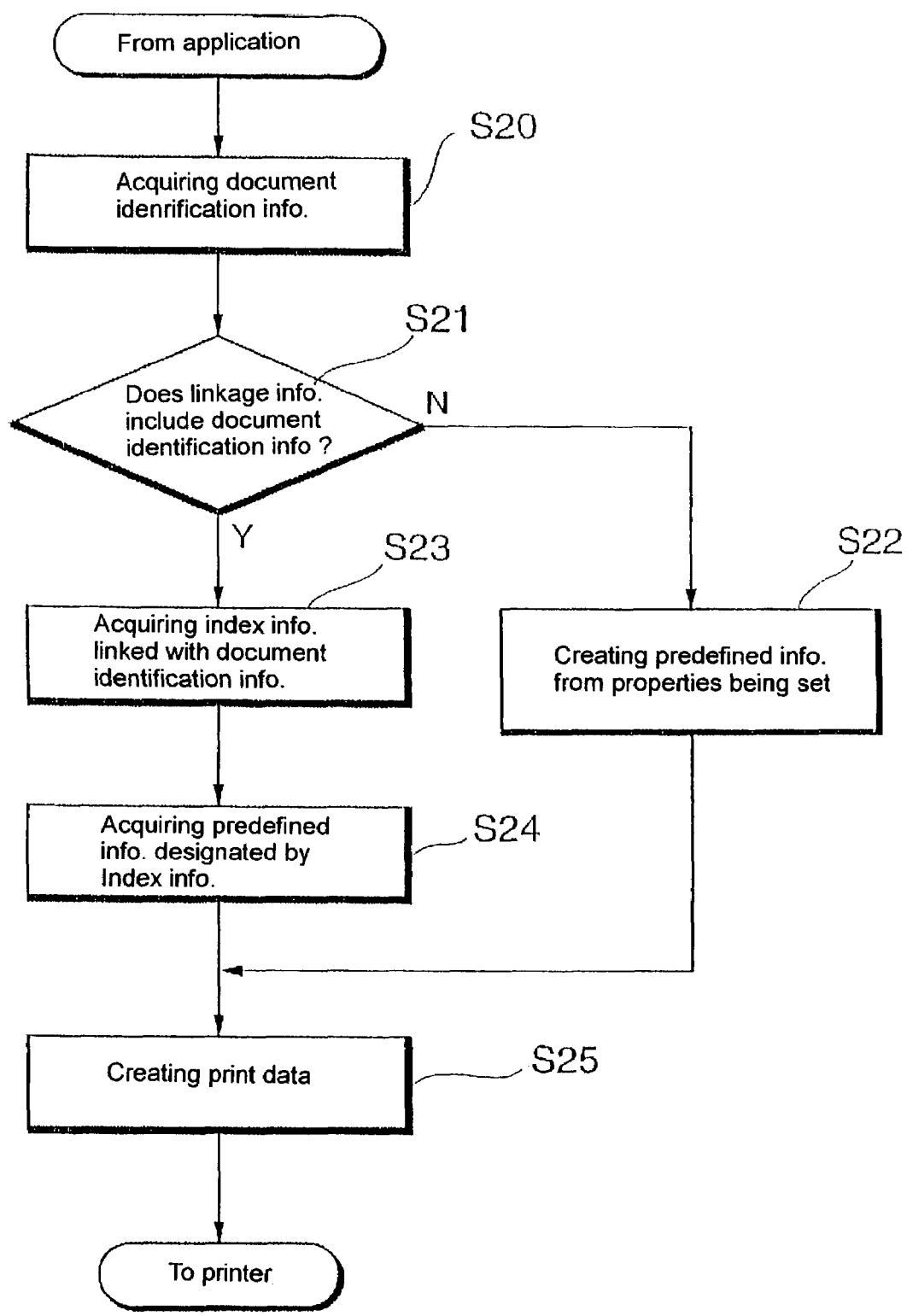
FIG. 7 is a flow chart showing operations for printing a document according to the first embodiment.

The operations of the print control unit 10 to make the printer print documents will be described with reference to FIG. 7.

The application program receives the instruction for printing from the user and send the information to the document information acquiring section 14 so that the document information acquiring section 14 acquires the file name of the document to be printed as the document identification information (Step S20).

The file name received by the document information acquiring section 14 is sent to the linkage information checking section 17 so that the linkage information checking section 17 retrieves the file name and the linkage information which links the file name and the index information. As shown in FIG. 8, the linkage information checking section 17 decides whether or not the file name is included in the linkage information as result of the retrieval (Step S21).

When there is no linkage information that contains the document file name, it indicates that the document to be printed has not been linked with the predefined information. The linkage information checking section 17 feeds with the print data creating section 19 the properties that are being predefined by the driver as the predefined information (Step S22).

Figure 9:
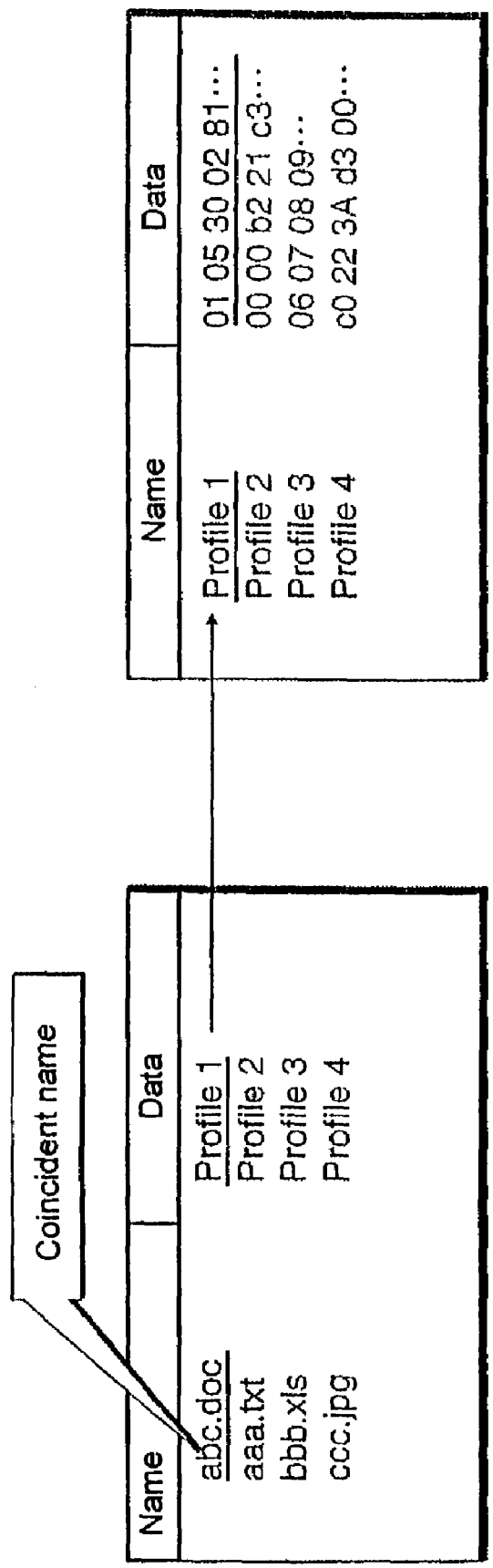
FIG. 9 is tables showing a relationship between a linkage information memory section and a predefined information memory section.

In FIG. 9, when the linkage information including the document file name is retrieved, the linkage information checking section 17 obtains the index information corresponding to the file name from the linkage information and sends the index information to predefined information acquiring section 18 (Step S23).

When the predefined information acquiring section 18 receives the index information, the predefined information acquiring section 18 reads out the defined information corresponding to the index information from the predefined information storing section 13 and sends it to the print data creating section 19 (Step S24).

When the print data creating section 19 receives the predefined information, it acquires the data of the document to be printed according to the document identification information. The print data creating section 19 creates the data, which controls and makes the printer print the document, based upon the document data and the predefined information (Step S25).

The data which is sent to the printer may be the selected predefined information and the print data of the document or the document data which is changed based upon the selected predefined information.

As shown in FIG. 3, when the file name in the predefined information is designated, sometimes, the designated file name is the same as the file name that already exists. In this case, such a display as shown in FIG. 4 appears. Then, a message for promoting change of the file name is displayed.

In addition, there is an occasion that when the file is linked, the file has been already linked. In this case, a display of FIG. 6 appears. Then, a message, which asks if the linkage is changed, is displayed.

When the linkage information is deleted, such a display as shown in FIG. 6 appears. In order to delete any linkage information, the linkage information is selected in the display. If the predefined information is used for only the deleted linkage information, the predefined information is also deleted.

As described above, the print control unit 10 according to the present invention creates and stores the linkage information which links the file name for identifying the document and the index information for indexing the predefined information corresponding to the file name so as to acquire the file name of the document to be printed and the index information of the document to be printed in accordance with the linkage information. The print control unit 10 acquires the predefined information of the document to be printed according to the index information. Consequently, the predefined information corresponding to the document to be printed can be selected without depending upon user's memory.

The print control unit 10 of the present invention links the index information for designating the predetermined information with the document. Accordingly, the print control unit 10 can link, without any complicated hardware, any existing predetermined information which is designated by the index information created by a conventional print control unit.

Second Embodiment

In the first embodiment, the document identification information is the file name of the document. However, when document stored in a directory of the information processing apparatus is printed, sometimes the document is given the same file name as the file name which is given to another document stored in another directory of the information processing apparatus. Accordingly, in the second embodiment, the creation time of document is treated as another piece of document identification information in addition to the file name of the document in order to identify a plurality of document having the same file name. Another way is to register the storage location in addition to the document name.

The print control unit according to the second embodiment has a structure identical to that of the first embodiment except the following sections:

the document information acquiring section 14 to acquire the document identification information indicated by the file name and the creation time of the document;

the linking section 15 to create the linkage information which links the document identification information and the index information;

the linkage information storing section 16 to store linkage information including the creation time of the document; and the linkage information checking section 17 to check whether or not the linkage information including the document creation time includes any information to indicate the creation time of the document acquired by the document information acquiring section 14.

The linkage information according to the second embodiment which links the document identification information indicated by the file name and the creation time with the index information will be described with reference to FIG. 12.

Figure 12:
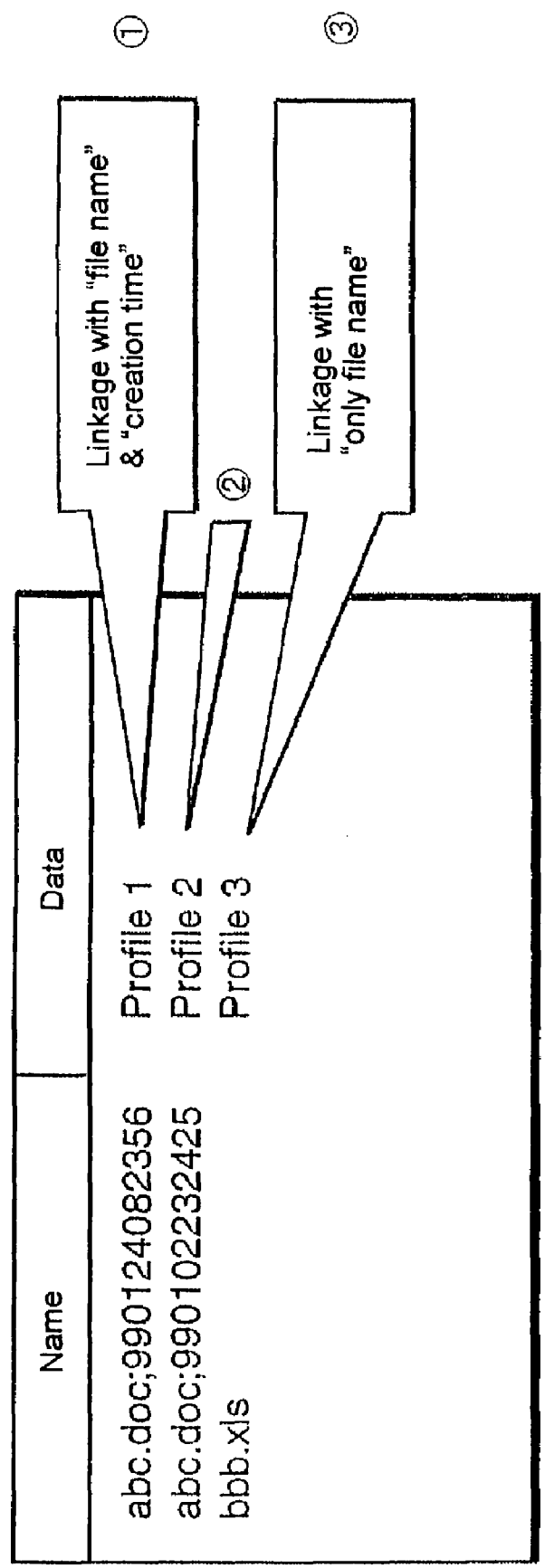
FIG. 12 is a table showing a linkage (correlation) information in the second embodiment.
Figure 13:
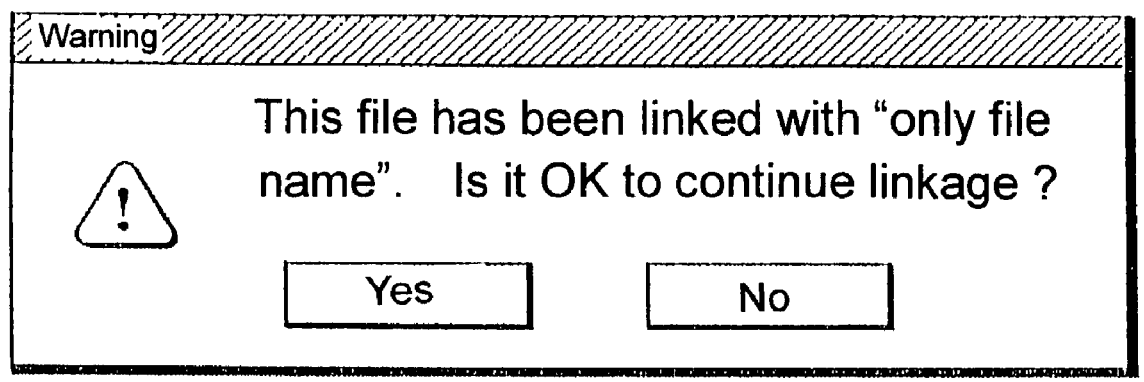
FIG. 13 is a diagram of a monitor display showing a warning on the correlation in the second embodiment.

For example, the linkage information is shown in row ① in FIG. 12, wherein the index information is "Profile 1", the file name of the corresponding document is "abc.doc", and the creation time of the document is 08 o'clock 23 minutes 56 seconds of Jan. 24, 1999. That is, the document identification information is composed of the file name or "abc.doc" and the creation time or "990124082356". This document identification information is inked with the index information of "Profile 1".

Figure 10:
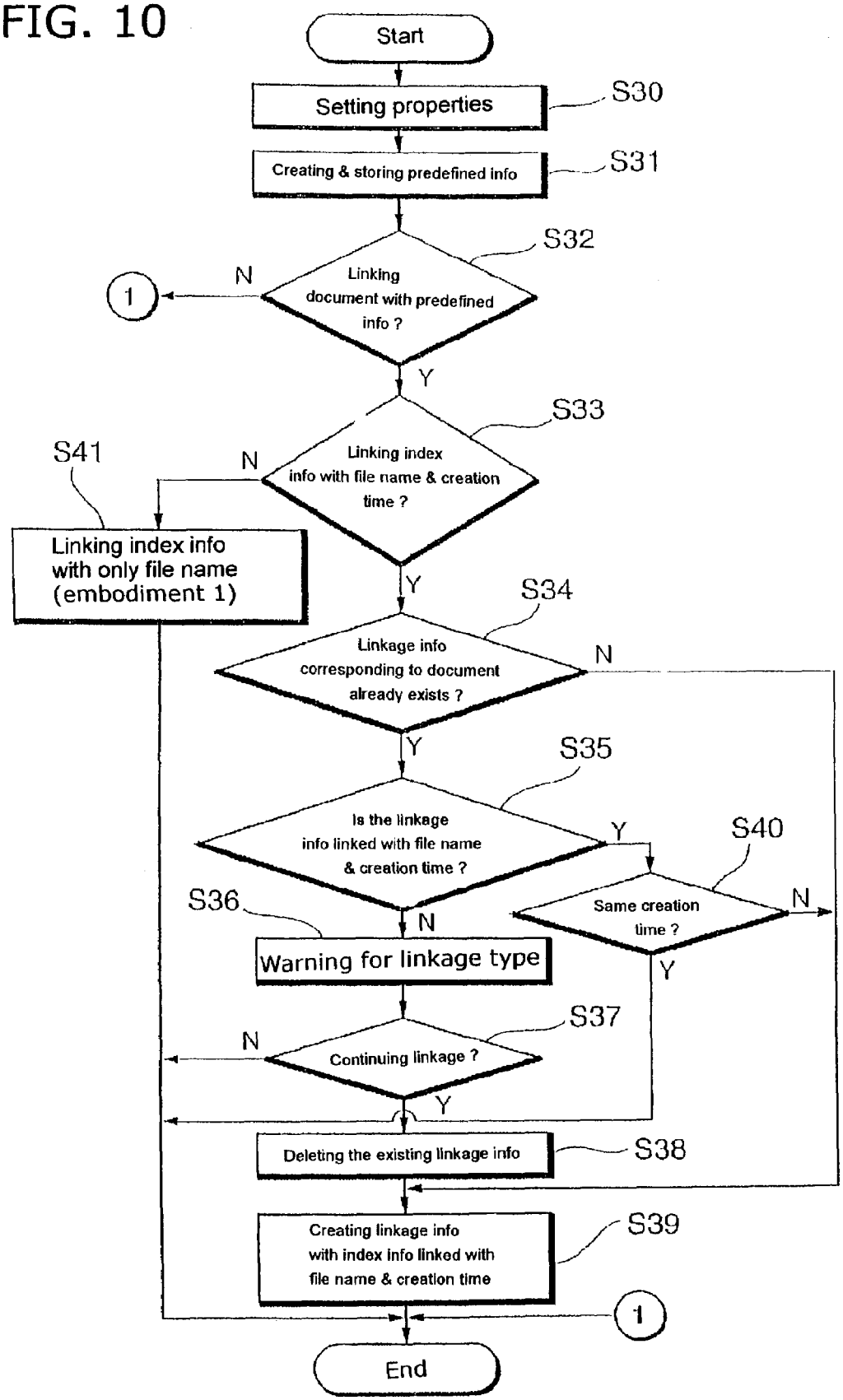
FIG. 10 is a flow chart showing operations which correlate document identification information with index information according to the second embodiment of the invention.

The operation of the print control unit 10 to link the document identification information and the index information will be described with reference to FIG. 10.

In a printer driver, the properties to control the printer are inputted by the user through the input section so that the property setting section 11 sets them as "properties" (Step S30).

The predefined information creating section 12 creates predefined information of binary data called profile from the properties set by the property setting section 11. At this point, the display shown in FIG. 3 appears in the display section and the index information to index the predefined information is inputted by the user through the input section so as to create pairs of the index and predefined information shown in FIG. 4. These pieces of information are stored in the predefined information storing section 13 (Step S31).

The user decides whether or not the document is linked with the predefined information (Step S32).

When the document is not linked with the predefined information, "close" is clicked in the display of FIG. 3. Consequently, the linking section 15 does not create the linkage information and the process is ended.

When the document is linked with the predefined information, "link" is clicked in the display of FIG. 3. Consequently, the index information is sent to the linking section 15 and the display in FIG. 11 is shown in the display section 3.

Figure 11:
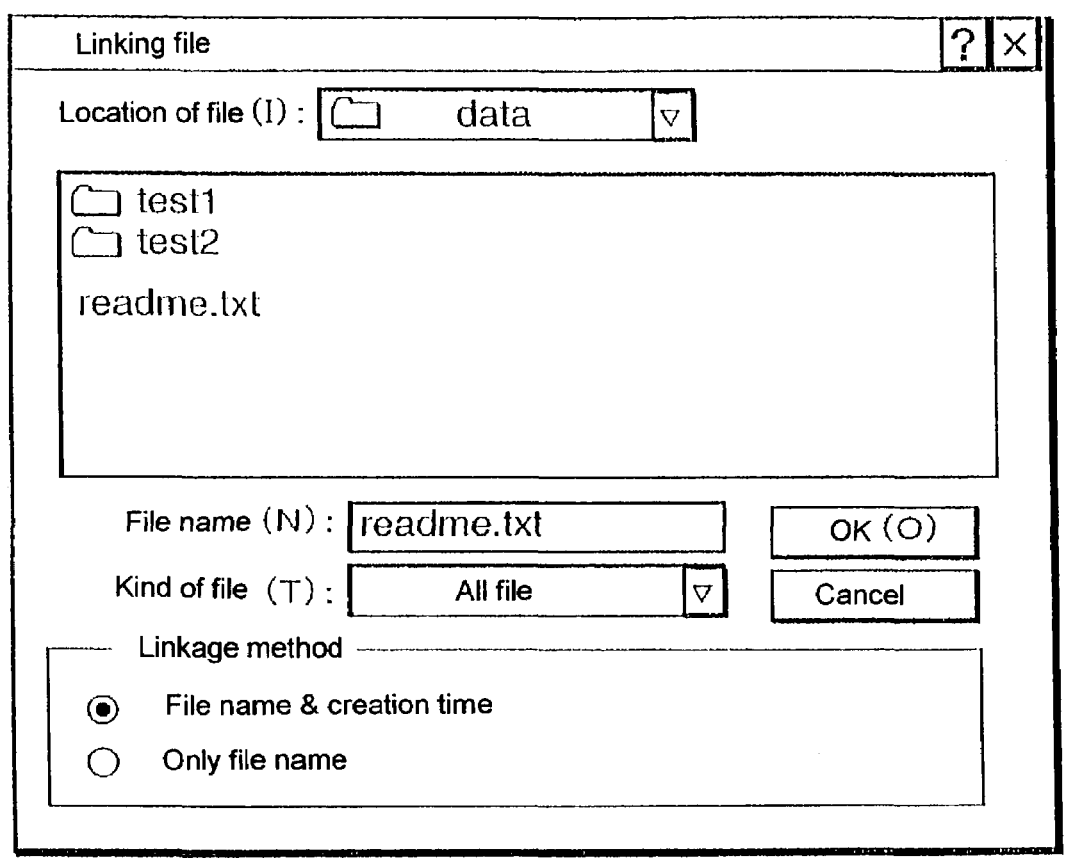
FIG. 11 is a diagram of a monitor display showing the linkage (correlation) in the second embodiment.

In FIG. 11, the file name of the document to be linked is inputted through input section 2 and the linkage type is selected. The types to be selected includes the first type, wherein the index information is linked with only the file name of the document, and the second type, wherein the index information is linked with the file name and the creation time of the document. Directory information may be added as one of the linkage types. The user selects one of the linkage types and click the button "OK" in FIG. 11 to start the linkage (Step S33).

When the type of the linkage is selected, the linking section 15 decides if there is already the linkage information of the document. This decision is performed with reference to the linkage information storing section 16 (Step S34).

When there is no linkage information, the linking section 15 creates the linkage information which links the file name and the creation time (Step S39).

When there is the linkage information, the linking section 15 decides if the existing linkage information is such a type that the index information is linked with the file name and the creation time (Step S35).

When the existing linkage information is of the above type, the linking section 15 decides if the creation time of the document included in the existing linkage information is the same as the creation time of the document that is being linked (Step S40).

When the creation times are the same, the linking section 15 does not create new linkage information and the linkage job is ended.

When the creation times are different from each other, the linking section 15 creates the linkage information which links the index information with the document identification information having the same file name and the different creation time (Step S39).

Back to the step S35, when the existing linkage information is not the type which links the index information with the file name and the creation time, that is, when the existing linkage information is the type which links the index information with only the file name, a warning of shown in FIG.

13 is displayed in the display section because it is different from the linkage type selected by the user (Step S36).

The user decides with the warning whether or not the user continues the linkage job (Step S37).

When the discontinue of the linkage is selected, the linking section 15 does not create the linkage information and the linkage job is ended.

When the continue of the linkage is selected, the linking section 15 deletes the existing linkage information which has been linked in the linkage type different from the selected linkage type of the document to be linked (Step S38).

Then, the linking section 15 creates the linkage information which links the index information with the file name and the creation time (Step S39).

Back to the Step S33, when such a type that links the index information with only the file name is selected, the operation is the same as that in the first embodiment and, therefore, the description thereof is omitted (Step S41).

Figure 15:
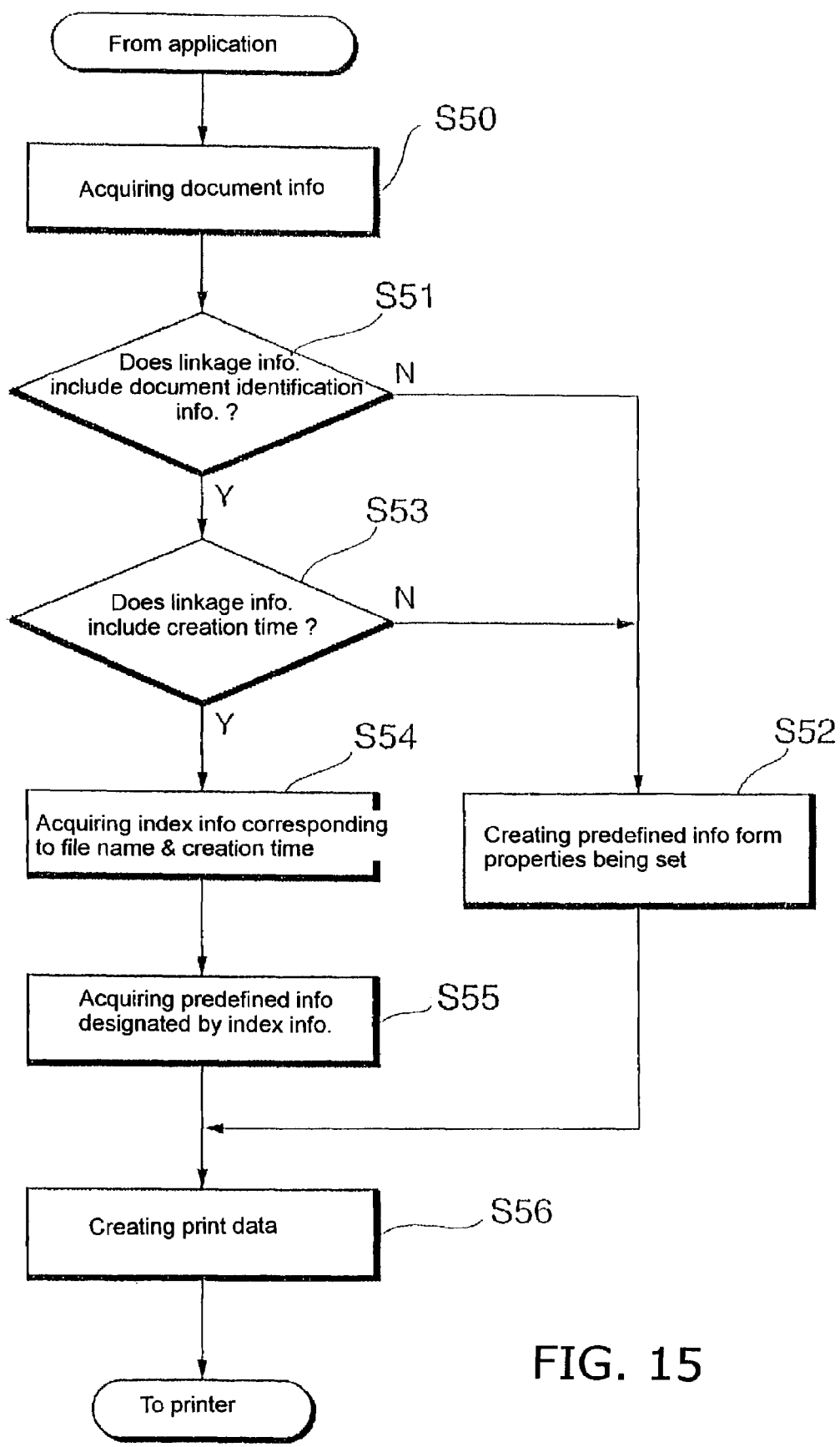
FIG. 15 is a flow chart of operations for printing a document according to the second embodiment.

The operation to make the printer print the document will be described with reference to FIG. 15.

The document information acquiring section 14 acquires the file name and the creation time of the document to be printed as the document identification information according to information of the application program and sends the document identification information to the linkage information checking section 17 (Step 50).

When the linkage information checking section 17 receives the document identification information, it checks whether or not the linkage information includes the file name of the document to be printed (Step S51).

When the linkage information does not include the file name of the document, it is decided that the document to be printed has not been linked with the predefined information so that the properties that are being predefined as the predefined information are sent to the print data creating section 19 (Step S52).

When the linkage information includes the file name of the document, the linkage information checking section 17 checks if the linkage information includes the creation time of the document to be printed (Step S53).

When the linkage information does not include the creation time of the document, the linkage information checking section 17 decides that the document has not been linked with the predefined information and sends the properties that are being predefined as the predefined information to the print data creating section 19 (Step S52).

When the linkage information includes the file name and the creation time of the document, the linkage information checking section 17 acquires the index information corresponding to the file name and creation time and sends the index information to the predefined information acquiring section 18 (Step S54).

The predefined acquiring section 18 selects the predefined information corresponding the index information from the predefined information storing section 13 and sends the predefined information to the print data creating section 19 (Step S55).

When the print data creating section 19 receives the predefined information, it acquires data of the document to be printed according to the predefined information and the document identification information. Then, the print data creating section 19 creates data, which controls and makes the printer print the document, in accordance with the data of the document and the predefined information (Step S56).

When, as shown in row ① of FIG. 12, there is a document having the linkage information, of which the document identification information is "abc.doc;990124082356" and the corresponding index information is "Profile 1", is stored in the linkage information storing section 16 of the information processing apparatus 1, the linkage information of another document, which is stored in a different directory of the information processing apparatus 1 having the same file name "abc.doc" but created at a different time, for example, 23 o'clock 24 minutes 25 seconds on Jan. 2, 1999, is created by linking with the index information "Profile 2". How to store the linkage information of the different document in the linkage information storing section 16 will be described The existing document (first document) and another document (second document) have the same file name "abc.doc". However, since the first document has the creation time, 990124082356the, it was created at 08 o'clock 23 minutes 56 seconds on Jan. 24, 1999, which is different from the creation time of the second document. The first and second documents are identified as different documents although they have the same file name. Accordingly, as shown in row ② of FIG. 12, new linkage information, with which the index information "Profile 2" is linked, is created and stored in the linkage information storing section 16.

For example, three pieces of linkage information are stored in the linkage information storing section 16. The first linkage information has the document identification information "abc.doc;990124082356" and the index information "Profile 1" as shown in row ① of FIG. 12, the second information "abc.doc;990102232425" and "Profile 2" as shown in row ②, and the third information "bbb.xls" and "Profile 3" as shown in row ③. How to search the linkage information of the document having the file name "abc.doc" and created at 23 o'clock 24 minutes 25 seconds on Jan. 02, 1999 will be described.

The linkage information checking section 17 acquires the file name "abc.doc" and the creation time "990102232425" of the document to be printed from the document information acquiring section 14 and checks if the document identification information of the linkage information in the linkage information storing section 16 includes the file name "abc.doc". The linkage information shown in row ③ is excluded from candidates of the linkage information to be searched because it has the file name "bbb.xls", which is different from the file name to be searched. Meanwhile, the linkage information shown in rows ① and ② have the file name "abc.doc", which is the same as the file name to be searched. Then, the linkage information checking section 17 searches the linkage information, which has the creation time, 99010223425 following a semicolon ";" after the file name. Consequently, the linkage information shown in row ② of FIG. 12 is selected because it has the file name and creation time of the document to be searched.

As fully described above, the print control unit 10 according to the present invention creates and stores the linkage information, which links the document identification information including the file name and the creation time, and the index information capable of indexing the predefined information corresponding to the document identification information. Therefore, even if there are a plurality of document having the same file name, the predefined information of the document to be printed can be selected without depending upon user's memory by adding the creation time of the document as another piece of the document identification information.

According to the present invention, the linkage information is created and stored, which links the document identification information for identifying the document and the index information for indexing the predefined information corresponding to the document identification information. When the document previously printed is printed, the index information of the document to be printed is acquired according to the document identification information and the linkage information. Then, the predefined information of the document to be printed is acquired according to the index information. Consequently, it is not necessary that the user memorizes the properties for printing the document or the predefined information linked with the document. Since the predefined information of the document previously printed can be automatically acquired, the burden imposed on the user is lightened.

Although the embodiments of the present invention describe the example that the print control unit is incorporated in the information processing apparatus, the print control unit may be incorporated in a printing apparatus, such as a printer, a copying machine, and a facsimile. In such a case, the property setting and the predefined information registration are performed in the information processing apparatus and sent to and stored in the printing apparatus. When, the print of a document is started in the information processing apparatus, the information processing apparatus sends the document name and printing data to the printing apparatus. The printing apparatus selects the predefined information corresponding to the document name and starts a printing job with the printing data sent from the information processing apparatus.

In the embodiments of the present invention, the predefined information is stored according to the document name, however, it may be stored according to the kind of the application or the name of individual user.

The invention claimed is:

1. A print control unit comprising:
   a receiving section for receiving print data;
   a predefined information storage section for storing predefined information for printing;
   a corresponding information storing section for storing corresponding information of an identification mark of the print data and the predefined information;
   a detection section for detecting the identification mark;
   a predefined information selecting section for selecting the predefined information corresponding to the identification mark according to the corresponding information; and
   a processing section for processing the print data according to the predefined information for printing.

2. The print control unit according to claim 1, which further comprises:
   a print data creating section which creates the print data from a document; and
   a data transmitting section which transmits said print data created by said print data creating section and said predefined information selected by said predefined information selecting section.

3. The print control unit according to claim 1, which further comprises:
   a print data creating section which creates the print data from a document;
   a data correcting section which corrects said print data created by said print data creating section according to said predefined information selected by said predefined information selecting section; and
   a data transmitting section which transmits said print data corrected by said data correcting section.

4. The print control unit according to claim 1, wherein said predefined information storage section is adopted to store the predefined information including index information which identifies said predefined information and is linked with said identification information so as to be stored in the predefined information storage section.

5. The print control unit according to claim 4, further comprising an input section for inputting the index information.

6. The print control unit according to claim 5, further comprising a display section for displaying a command to change the index information.

7. The print control unit according to claim 1, further comprising an input section for correlating the identification mark and the predefined information.

8. The print control unit according to claim 7, wherein said input section is adopted to delete the identification mark.

9. The print control unit according to claim 8, wherein said input section is adopted to delete the predefined information when the identification mark does not correspond to the predefined information.

10. The print control unit according to claim 1, further comprising a display section for prompting the identification mark to correspond to the predefined information.

11. The print control unit according to claim 1, wherein said predefined information storage section is adopted to store the predefined information defined with a property of a printer driver.

12. The print control unit according to claim 1, wherein said corresponding information storing section is adopted to store the identification mark including a kind of an application for creating a document.

13. The print control unit according to claim 1, wherein corresponding information storing section is adopted to store the identification mark including information on a time at which a document is created.

14. The print control unit according to claim 1, wherein said corresponding information storing section is adopted to store the identification mark including information on a location in which a document is stored.

15. The print control unit according to claim 1, wherein said corresponding information storing section is adopted to store the identification mark including file name information corresponding to the print data.

16. The print control unit according to claim 1, wherein said corresponding information storing section is adopted to store the identification mark including creation time information corresponding to the print data.

17. The print control unit according to claim 1, wherein said predefined information selecting section is adopted to select the predefined information currently set for printing when the identification mark does not exist in the corresponding information.

18. A printer driver comprising the print control unit according to claim 1.

19. The printer driver according to claim 18, wherein said predefined information storage section is adopted to store the predefined information of the printer driver.

20. An image forming apparatus comprising the print control unit according to claim 1.

* * * * *